United States Patent [19]

Cecchellero et al.

[11] Patent Number: 4,835,358
[45] Date of Patent: May 30, 1989

[54] METHOD AND APPARATUS FOR SOLDERING A PLATELIKE BODY

[75] Inventors: Sergio Cecchellero, Milan; Daniele Salvatore, Cusano Milanino, both of Italy

[73] Assignee: Italtel Tecnomeccanica S.P.A., Terni, Italy

[21] Appl. No.: 3,405

[22] PCT Filed: Apr. 11, 1986

[86] PCT No.: PCT/EP86/00214
§ 371 Date: Feb. 24, 1987
§ 102(e) Date: Feb. 24, 1987

[87] PCT Pub. No.: WO86/06309
PCT Pub. Date: Nov. 6, 1986

[30] Foreign Application Priority Data

Apr. 26, 1985 [IT] Italy .................. 20516 A/85

[51] Int. Cl.⁴ .................................... B23K 11/32
[52] U.S. Cl. ...................... 219/107; 219/56; 219/78.01; 219/85.19
[58] Field of Search ............... 219/56, 66, 67, 78.01, 219/86.1, 79, 107, 80, 85 G

[56] References Cited

U.S. PATENT DOCUMENTS 2,550,965  5/1951  Brown .................... 219/107 X
3,600,548  7/1970  Bock ...................... 219/79
3,699,756 10/1972  Ritter et al. ............ 219/107 X
4,383,163  5/1983  Sjöholm .................. 219/107
4,610,561 12/1984  Cecchellero et al. ...... 403/171

FOREIGN PATENT DOCUMENTS 657169  10/1935  Fed. Rep. of Germany .
2011007  9/1978  United Kingdom .
2152174 11/1984  United Kingdom .

Primary Examiner—Clifford C. Shaw
Attorney, Agent, or Firm—Birch, Stewart, Kolasch & Birch

[57] ABSTRACT

A process and apparatus for soldering a platelike body inside hollow elements involves placing the platelike body and a hollow element on respective supports. The platelike body is drawn out or move to become positioned for electrical connecting to a first electrode of a soldering machine. This machine has at least a first and second electrode through which a voltage is applied to solder the platelike body to the hollow element using the Joule effect. A series of at least four phases will be carried out by the apparatus during the process. Protrusions are provided within the hollow element to concentrate current flowing therethrough and to aid connection of the element to the platelike body. Various check elements can be provided to determine the adequacy of the connection to the platelike body to the hollow element.

13 Claims, 4 Drawing Sheets

METHOD AND APPARATUS FOR SOLDERING A PLATELIKE BODY

BACKGROUND OF THE INVENTION

1. FIELD OF THE INVENTION

The present invention relates to a process for the automatic soldering of a platelike body inside hollow elements having a transverse, polygonal-shaped section and relates to the soldering machine which will perform said process.

2. DESCRIPTION OF THE BACKGROUND ART

Various soldering machines and processes are known in the prior art. For instance, Italian patent application No. 23804 A/83 describes a modular structure for carpentry work. This structure is mainly composed of a plurality of bars that are assembled through joints. These joints are shaped so as to accommodate the screw heads whose shank can be screwed into a platelike body arranged at both bar ends, perpendicular to their axes. According to a preferential embodiment said platelike body is joined to the bars with solder.

The bars have a transverse polygonal-shaped section and the automatic soldering operations require that the technical problems connected with the arrangement of the platelike body inside a element be overcome. Also, the problem of soldering more sides of the platelike body to the respective internal faces of the element must be solved.

It is well-known that the most suitable soldering process to be performed under an automatic process is a "thermal resistance" process where the heat, through the Joule effect, is produced on the contact surface among the sections to be soldered, which is placed between a pair of electrodes. When such a process is separately performed by soldering a side of the platelike body to the respective internal face of the bar, no particular technical problems are evidenced. Such a process, however, is not compatible with the speed of the automatic production line. In particular, the structure as this design would require the successive execution of four soldering operations and would therefore spend more time than is required by other bar processing designs such as boring, shearing, etc. If the soldering process is divided into four different operations, a reduction in the speed of the production line results.

SUMMARY OF THE INVENTION

The present invention therefore has an object of the provision of a suitable process capable of performing the simultaneous soldering of each side of the platelike body (for example, four or more sides) to the respective internal portion of a hollow element as well as the object of providing a suitable machine for carrying out such a process.

To this end, the process, according to the present invention, carries out the steps of placing the bar and the platelike body on a respective support and drawing out the platelike body and electrically connecting the body to a first electrode of the soldering machine. The unit composed of "first electrode—platelike body" is then moved to allow the insertion of the platelike body inside the bar, into a position which coincides with the junction line between the first and the second part of the second electrode of the soldering machine. The first and/or second part of the second electrode are themoved along the junction line and as they come into contact with the bar, an electric potential between the first and second electrode is applied.

Further scope of applicability of the present invention will become apparent from the detailed description given hereinafter. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
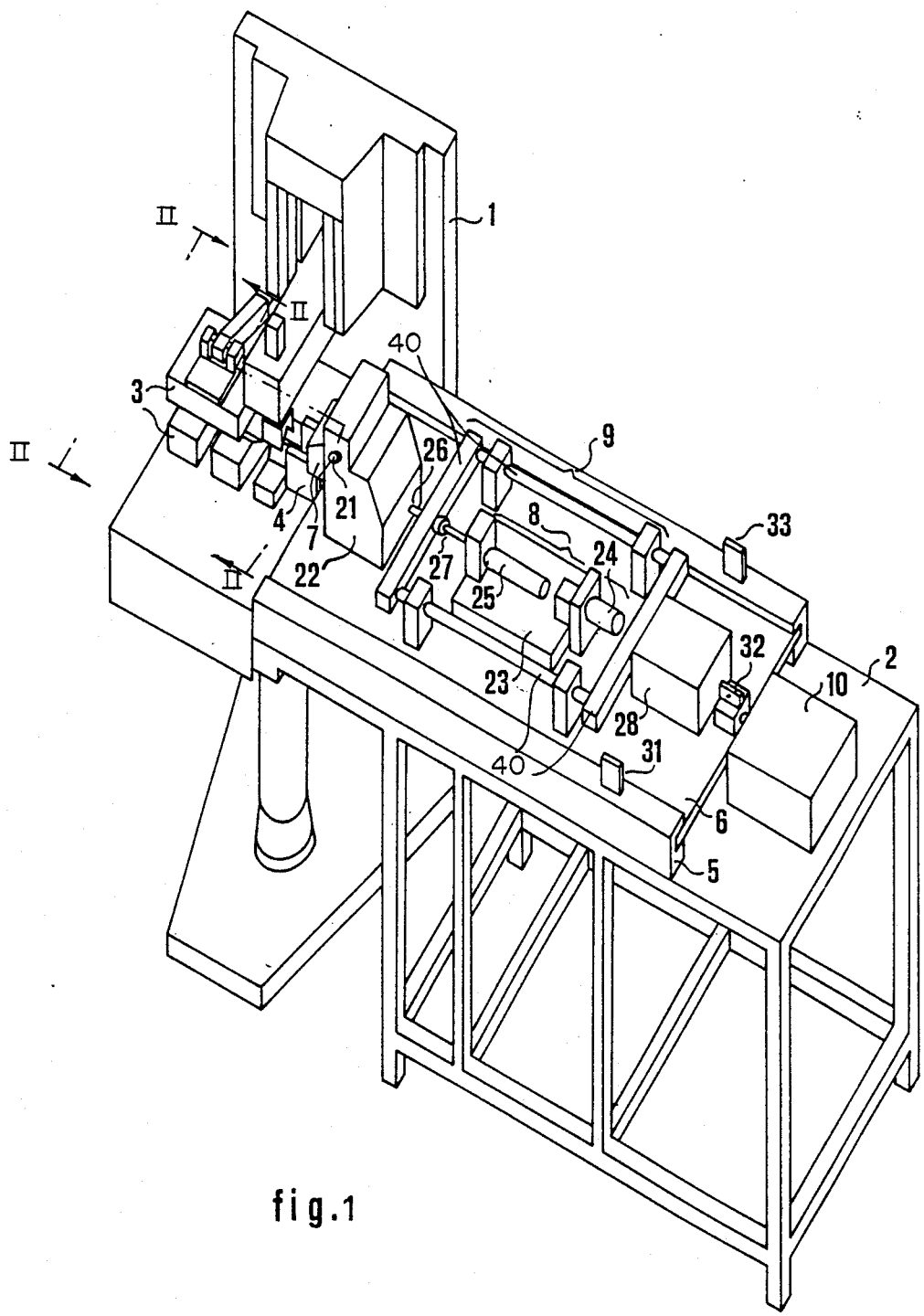
FIG. 1 shows a perspective view of the machine of the present invention.
Figure 3A:
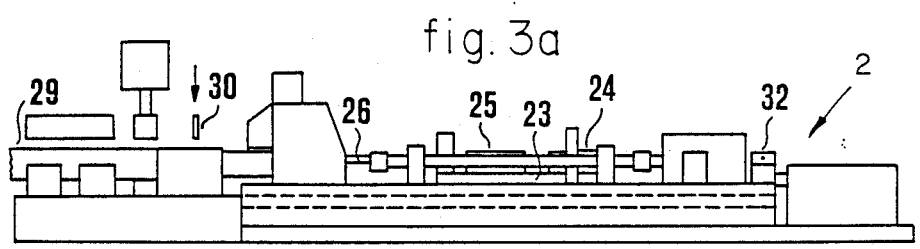
FIGS. 3a-e show the different phases of the process of the present invention.

Referring in detail to the drawings and with particular reference to FIG. 1, the machine of the present invention is shown. This machine is mainly constituted by a column 1 and a bench 2. Column 1 forms the soldering machine and includes devices 3 for the accommodation and the locking of the bar and devices 4 for the accommodation and the support of the platelike body. These devices 3 and 4 form the workpiece support devices. The bench 2 holds the devices necessary to allow the automatic insertion of the platelike body 30 inside the hollow element 29 in order to carry out the soldering operations as indicated in FIG. 3a. In particular, the bench 2 of FIG. 1 has a slide 5 along which a flat body 6 moves. This body 6 is suitable for supporting all the devices which allow the insertion mentioned above. A ground electrode 7 of the soldering machine, a device 8 for the drawing out or moving of the platelike body and a locking device 9 of the same body are located on the flat body 6. The flat body 6 is operated by a piston controlled by a pneumatic system 10.

Figure 2:
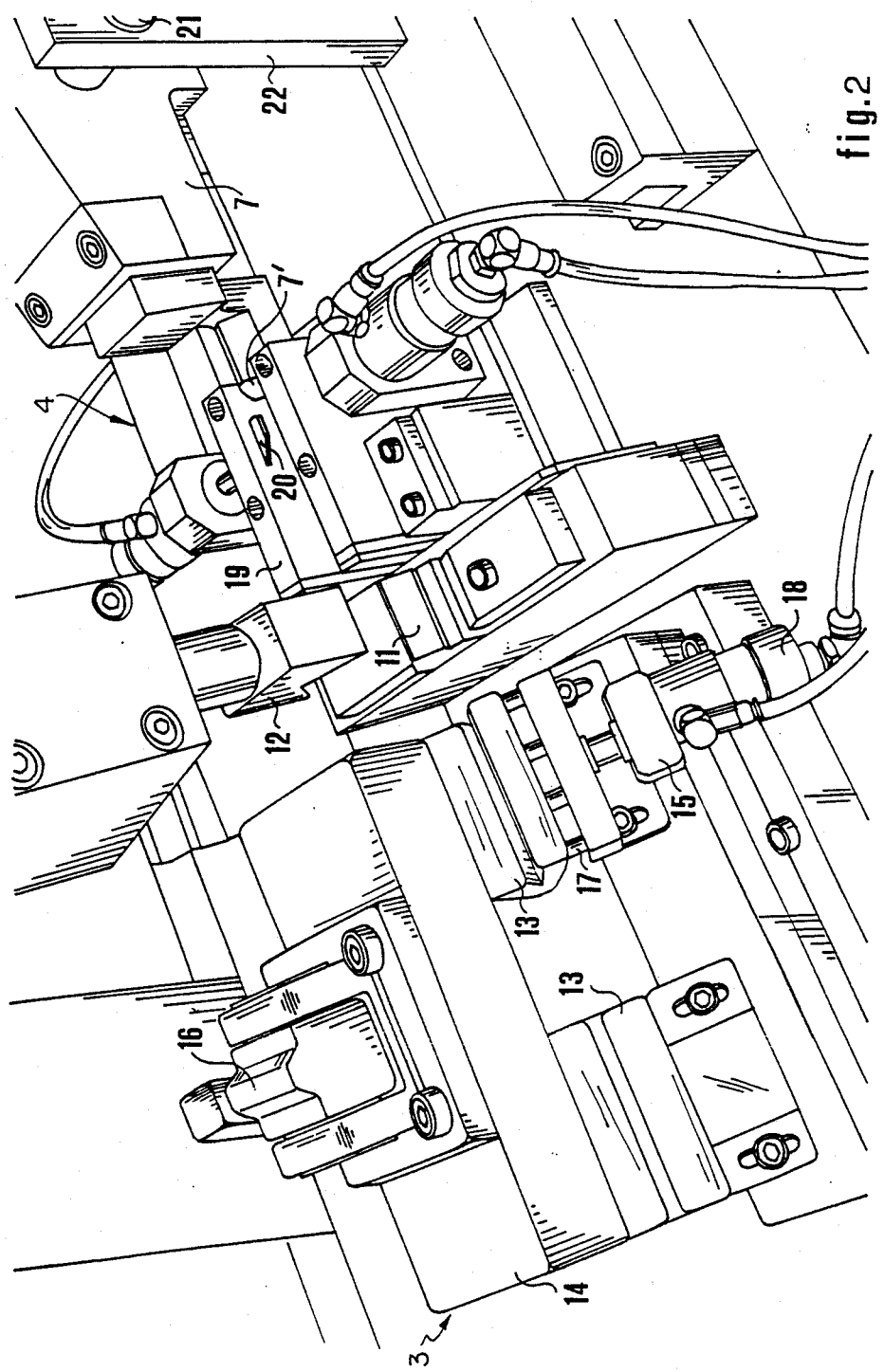
FIG. 2 shows the soldering unit of the machine shown in FIG. 1, in an enlarged scale taken along lines II—II.

As seen in an enlarged scale in FIG. 2, the soldering machine as well as the devices 3 and 4 of FIG. 1 are shown. The soldering machine contains the second electrode which is composed of a first and a second part (11 and 12, respectively). According to the present invention, the first part 11 is fixed, while the second part 12 is so shaped as to move vertically along slide guides provided on the column 1. The shape of the working surface for the first and second part is stated more clearly hereafter with reference to FIG. 4.

Device 3 is suitable for the location and the locking of the hollow element and is constituted by support devices 13, device 14 which prevent vertical shifting and device 15 which prevents horizontal shifting. Device 14 is composed of a plate having the bottom part grooved according to a profile which coincides with the edge of the hollow element with which it will come into contact. The top part of device 14 is connected to a toggle mechanism 16. The mechanism allows for shifting of the plate according to a defined circumference arc and will therefore permit device 14 to engage the hollow element between the support devices 13 and the plate of device 14. Device 15 is designed to prevent the hollow element from shifting horizontally and is mainly constituted by a plurality of pins 17 which are operated by a pneumatically controlled device 18. Under operating conditions, the pins 17 are placed inside holes, usually provided inside the hollow element and will prevent the hollow element from shifting horizontally.

Device 4 for the placing and support of the platelike body is made of an element 19, with a U-shaped section, which has its sides crossed by small pneumatically controlled pistons. The pistons each have a section 20 which extends out of the inner sides of element 19. The platelike body is therefore adapted to be placed between the sides of element 19 and will be held by sections 20 of the piston which extend from the sides of element 19.

FIG. 2 further shows the shape of the first electrode 7 of the soldering machine which is constituted by copper blocks anchored to a support 22 by means of a joint 21 The shape of the portion 7' of the electrode is similar to the profile of the platelike body. In particular, the front side of the portion 7' is shaped so as to present the same form as the platelike body. This design enlarges the contact surface and diminishes the electric resistance as will be described below.

In FIG. 1, the device 8 which draws out the platelike body 30 is noted. This device is place on a further flat surface 23, which can freely slide along the rack, moved by another piston, operated by a pneumatic control system 24. On this flat surface 23, a motor 25 is provided for causing rotation of a pin 26 having a threaded end. Said pin is so shaped as to cross the front bar of the locking device 9 as well as to cross the first electrode 7 and to come out from the front side of said portion 7'. The axis of pin 26 coincides with the axis of a hole 35 provided on the platelike body 30 as seen in FIG. 4. The motor 25 can be operated to cause the sliding of the flat surface 23 such that the pin 26 will be screwed into the hole 35 of the platelike body. When the screwing operation begins, the pistons 20 of the device 4 prevent the platelike body from moving.

The pin 26 presents a part of an enlarged section 27 adapted to act against the front bar of the locking device 9 which is moved by another pneumatically controlled piston 28. Once the drawing out device has completed the screwing process described above, the piston 28 carries back the locking device 9, whose front bar acts against the enlarged section 27 of pin 26 to pull it backward. The front bar of the locking device is a portion of a frame 40 which is connected to the piston 28.

Shifting is completed when the platelike body is joined to the front side 7' of the first electrode 7. In order to reduce the electric resistance between the platelike body and the first electrode, the adherence acquires a value (for example, some hundreds of Kg). The insertion of the platelike body into the hollow element is performed by the pneumatic system 10. This system 10 pushes the flat body 6 forward and consequently all the devices placed on it move forward including the unit composed of "first electrode—platelike body". The forward sliding of this unit is allowed by the pulling back of the section 20 of the pistons of the loading unit 4. These sections no longer come out from the inner sides of the elements 19 when pulled back and can therefore allow the forward sliding of the combined unit. The insertion of the platelike body into the hollow element is made easier by the way of joint 21 provided on the first electrode 7 which, by causing a light oscillation, can facilitate the entering of the platelike body.

The process according to the present invention will now be described with reference to FIG. 3. The first phase is shown in FIG. 3a and requires the placing of hollow element 29 and platelike body 30 on the relative support. In particular the hollow element 29 is pushed forward till it comes into contact with an element of the soldering machine.

Figure 3B:
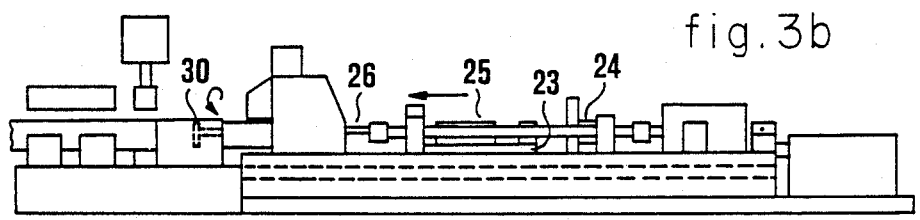
Figure 3C:
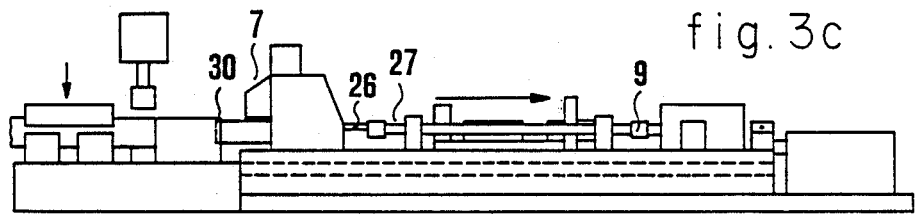

The second phase is illustrated in FIGS. 3b and 3c. In particular, this phase provides the switching on of motor 25 for causing rotation of pin 26 and the sliding forward of the flat surface 23 by means of the pneumatic control system 24. The rotation and sliding forward of the threaded pin 26 causes its screwing into the hole 35 of the platelike body 30 by a predetermined value. Once the screwing operation is completed, the motor 25 is turned off and the sliding forward of the flat surface 23 as well as the sliding back of the locking device 9 stops, as shown in FIG. 3c. The device 9 acts against the enlarged portion 27 of pin 26 by causing it to slide backwards along with the platelike body 30 till the platelike body abuts the front side 7' of the first electrode 7 by a predetermined force.

Figure 3D:
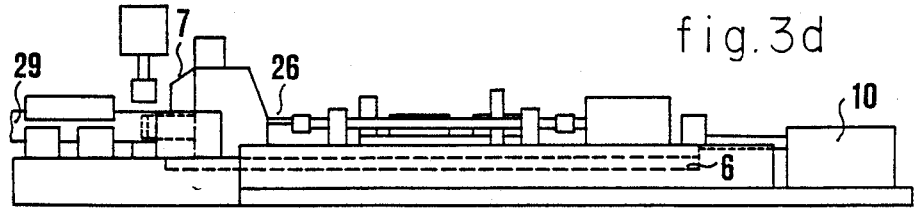

The third phase is illustrated in FIG. 3d and provides for the forward sliding of the flat body 6, controlled by the pneumatic system 10, and of the unit composed by the electrode 7 and platelike body 30 unit this unit is inserted into the hollow element 29.

Figure 3E:
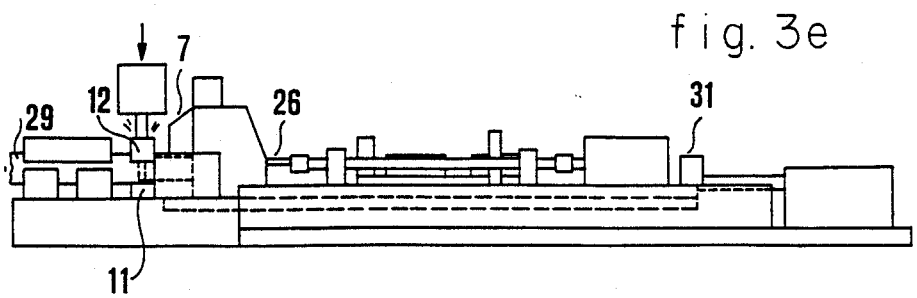

The fourth phase is shown in FIG. 3e and provides for the soldering operations. These operations are realized when carried out by the second part 12 of the second electrode moving into contact with the hollow element 29. A voltage is then applied between the first 7 and second electrode (11 and 12) and the platelike body 30 is soldered to the hollow element 29 by means of Joule effect, as better seen in FIG. 4.

The process, according to the invention, requires the performance of the four phases described above and if necessary, the performance of two other phases to make the soldering operations easier and to check the efficiency of the soldering operation.

Once the process described above is completed and before the machine begins a reset operation, a control is carried out on the soldering operation. Said check provides for applying a predetermined force to the platelike body 30, through the pin 26, the device 9 and the flat surface 6. Should the soldering operation fail to be well executed, the force applied will cause the disengagement and the carrying back of the platelike body 30. The devices which determine the forces that the platelike body 30 have substained are placed on the bench 2 and if the carrying effect exceeds a predetermined value, an alarm is issued. The means for checking are seen in FIG. 1 and comprise a photoemitting element 31 which emits a light ray usually interrupted by a screen 32 provided with a hole. If the sliding exceeds a predetermined value, the hole's axis coincides with the axis of the light ray which causes the actuation of an alarm as it reaches a photoreceiving unit 33.

According to another embodiment, the means for determining the carrying effect can be carried out by other means (not illustrated) which identify a drop in pressure in the pneumatic system when the platelike body is disengaged. This means actuates an alarm when a drop in pressure is determined.

The return to the initial position involves rotation of the motor 25 in the opposite direction to the screwing direction and the reset of the flat body 6 and flat surface 23 to their original position.

Figure 4A:
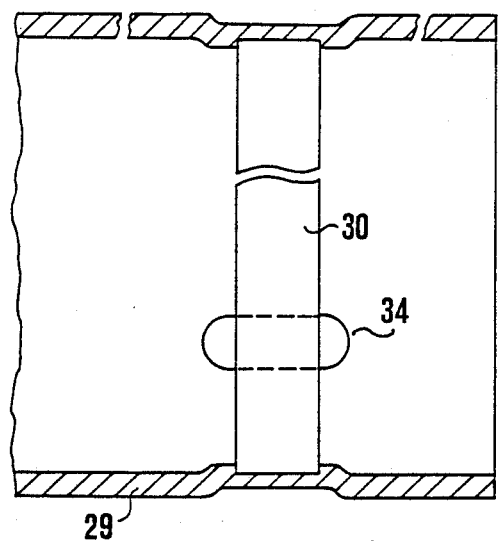
FIGS. 4a and 4b show a longitudinal and a transverse section, respectively, of a portion of a hollow element showing the structure of the platelike body and the second electrode of the soldering machine.
Figure 4B:
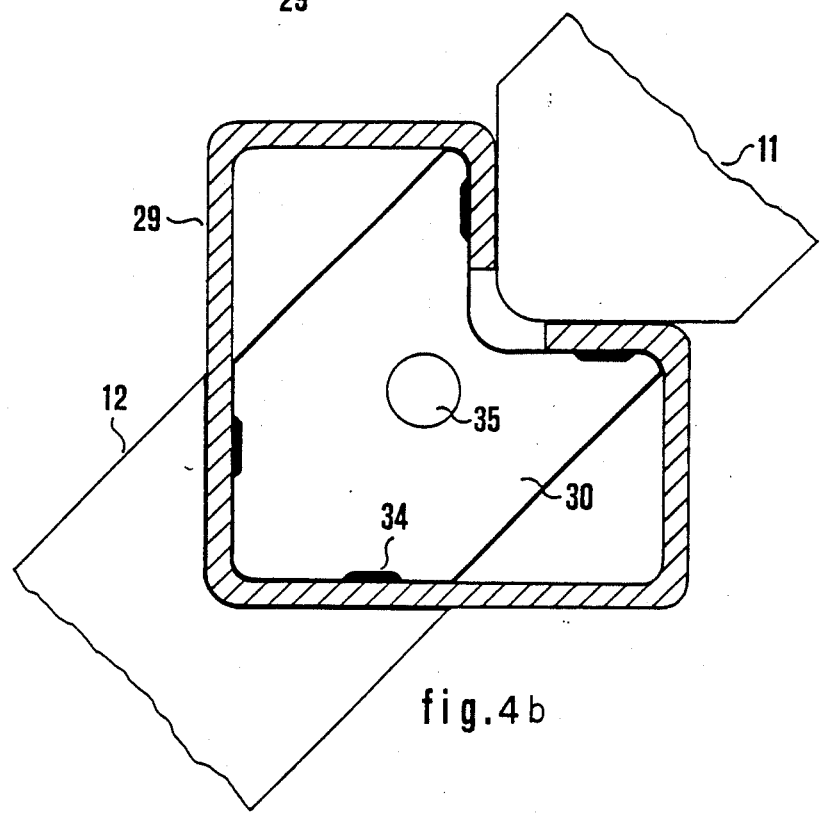

The soldering operations are facilitated by protrusions 34 on the sides of the hollow element, as shown in FIGS. 4a and 4b, wherein a longitudinal and transverse cross-section of the hollow element 29 are respectively shown. In FIG. 4b, the first and second parts 11 and 12 of the second electrode are schematically illustrated in order to better evidence the shape and arrangement of the relative working surfaces. From FIG. 4a, it is evident that the protrusions 34 are elliptical-shaped having an axis dimension greater than the thickness of the platelike body 30. The protrusions 34 provide for concentration of the current flowing in the surfaces to which they are interested and therefore cause a partial fusion of the surface which is in contact with the sides of the platelike body 30. The partial fusion develops into a penetration of the platelike body 30 in the protrusions by causing an increase of the contact resistance between the bar 29 and the platelike body 30.

The process and the machine according to the invention allow the contemporaneous soldering of four sides of the platelike body to the inner sides of the bar and reduce the time required, thus making the process and machine compatible with the working speed of an automatic production line. This process and machine obtain a good contact particularly, due to the shape of the protrusions. The protrusions 34 are realized just when the iron sheet is cut to obtain the hollow element 29. While a pneumatically operated machine has been described, it should be understood that other types of driving means can be used without digressing from the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Process for soldering of a platelike body inside a hollow element having a polygonal-shaped section comprising the steps of:
    placing the hollow element on a first support and placing the platelike body on a second support;
    moving the second support to electrically connect the platelike body to a first electrode of a soldering machine;
    shifting the first electrode and platelike body inside the hollow element to place the first electrode and platelike body between a first and a second part of a second electrode of the soldering machine;
    contacting at least one of said first and second parts of the second electrode with the hollow element;
    applying electric current between the first and the second electrodes; and
    soldering said platelike body inside said hollow element in response to applying of said current.

2. The process as recited in claim 1 further comprising checking the soldering at the end thereof by applying a predetermined force to said platelike body and attempting to slide platelike body relative to the hollow element.

3. The process as recited in claim 1 further comprising the step of placing a plurality of elongated protrusions within the hollow element having dimensions of their main axes greater than a thickness of the platelike body.

4. The process as recited in claim 2 wherein said checking and applying a predetermined force to said platelike body further comprising determining whether pressure within a pneumatic system for applying said predetermined force falls upon application of said force.

5. A machine for soldering a platelike body inside a hollow element comprising:
    a soldering machine comprising a first electrode, second electrode, and horizontal sliding element, said horizontal sliding element moving said first electrode in a horizontal direction, said second electrode having a first and a second part, one of which parts at least slides perpendicularly to the first electrode, said first electrode has a working surface conformed to a profile complementary to the hollow element for permitting the hollow element and first electrode to come in contact;
    first means for accommodating and locking the hollow element such that a longitudinal axis thereof generally coincides with the direction in which the first electrode is moved;
    second means for accommodating and supporting the platelike body such that movement generally perpendicular to the sliding direction of the first electrode is prohibited;
    third means for screwing a threaded pin operatively connected to the soldering machine into a hole provided in the platelike body;
    means for locking the platelike body to a surface of the first electrode by using a predetermined force;
    means for sliding the third means and the means for locking until the platelike body is completely inserted into the hollow element; and
    means for applying an electrical current between the first and second electrodes whereby said platelike body becomes soldered inside the hollow element.

6. The machine as recited in claim 5 wherein the first means further comprises:
    support devices having the working surfaces arranged at an angle complementary to the sides of the hollow element to which the working surfaces will come into contact;
    a vertical movement prevention device for preventing vertical movement of the hollow element, said device having a plate with a bottom side having a profile grooved conforming to a portion of the hollow element to which it will come into contact, an upper side of the device being connected to a toggle mechanism; and
    a horizontal movement prevention device for preventing horizontal sliding of the hollow element, said device having at least a pneumatically operated pin adapted to be placed inside a hole provided on the hollow element.

7. The machine as recited in claim 5, wherein said second means has a U-shaped element with sides having pistons therein, said pistons being located within said U-shaped element and having lock elements operatively connected therewith, the lock elements being reciprocable into and out of the sides of the U-shaped element and said pistons being controlled by a pneumatic controlled system.

8. The machine as recited in claim 5, wherein said third means has a pin having a threaded end connected to a motor mounted on a flat surface, said flat surface being freely slideable with respect to a flat body operated by a pneumatic system.

9. The machine as recited in claim 8, wherein said means for locking has a pneumatically operated unit having a front bar so shaped as to act against an enlarged portion of said pin whereby sliding of the bar causes the platelike body to have a predetermined force applied thereto, said force being used to determine whether the platelike body adheres to the first electrode.

10. The machine as recited in claim 5, wherein said means for locking has a pneumatically operated unit having a front bar so shaped as to act against an enlarged portion of said pin whereby sliding of the bar causes the platelike body to have a predetermined force applied thereto, said force being used to determine whether the platelike body adheres to the first electrode.

11. The machine as recited in claim 5, wherein said means for sliding a flat body for supporting said third means, the means for locking and the first electrode, whereby movement of said flat body causes horizontal sliding of said third means, said means for locking and said first electrode, said flat being moved by a pneumatically operated system.

12. The machine as recited in claim 5, further comprising means for checking soldering, the means for checking has a photoemitter unit, a photoreceiver unit, and a screen.

13. The machine as recited in claim 5, wherein the means for checking has a photoemitter unit, a photoreceiver unit and a screen.

* * * * *